Sept. 22, 1925.
W. HEAD
1,554,671
SOLDERING OF SHEET METAL TINS AND CANISTERS
Filed April 16, 1923   3 Sheets-Sheet 1
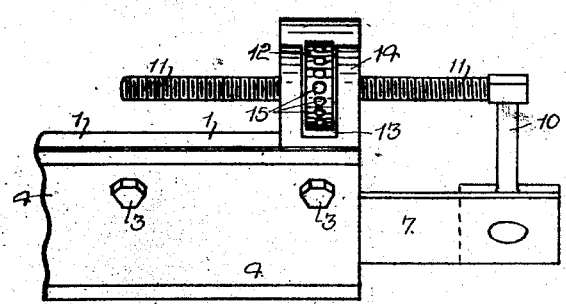
Fig. 1.
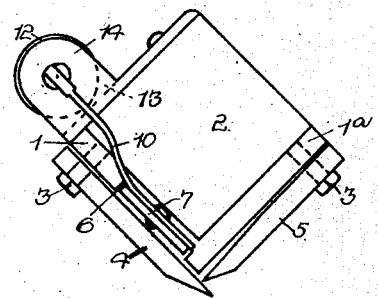
Fig. 2.
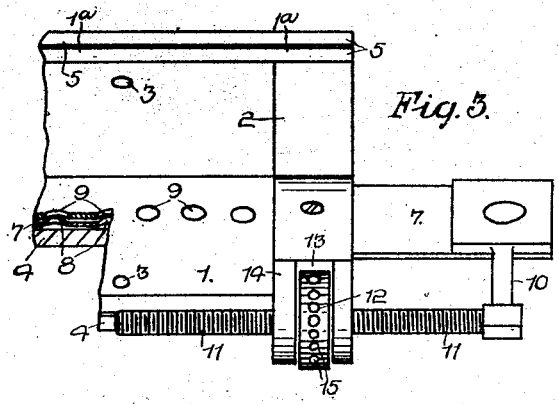
Fig. 3.
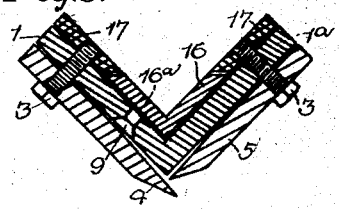
Fig. 5.
Fig. 6.
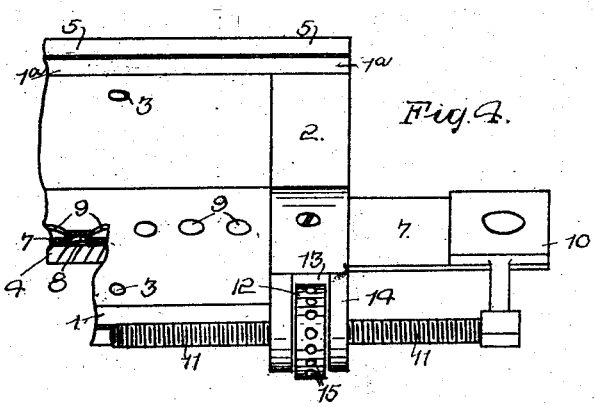
Fig. 4.
Inventor
William Head.
by
Att'ys Sept. 22, 1925.
W. HEAD
SOLDERING OF SHEET METAL TINS AND CANISTERS
Filed April 16, 1923    3 Sheets-Sheet 2
1,554,671
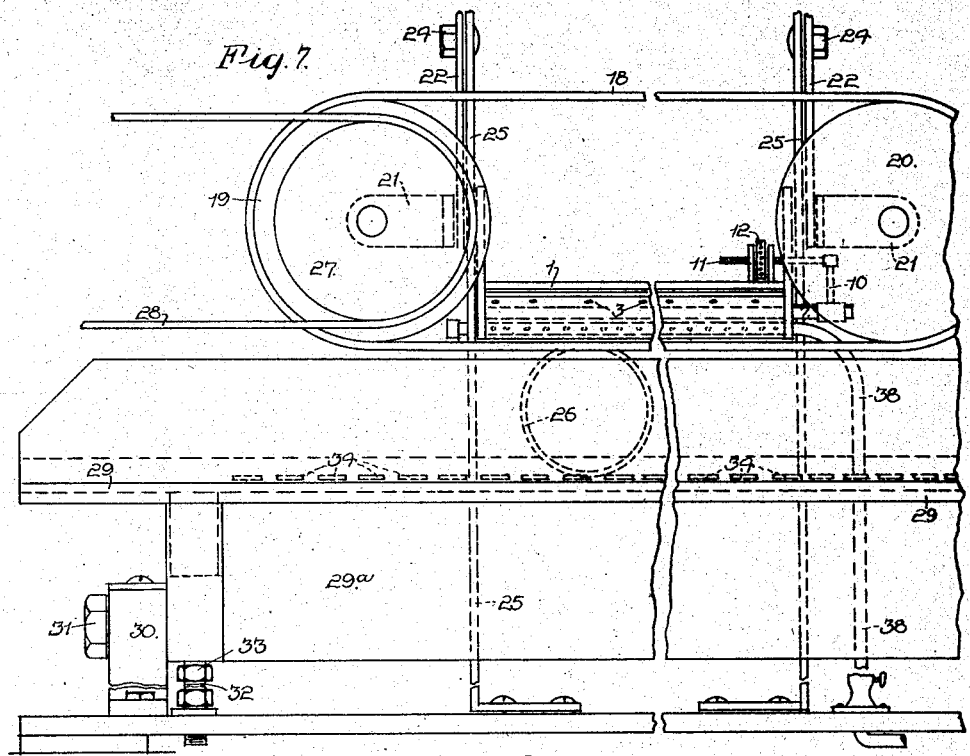
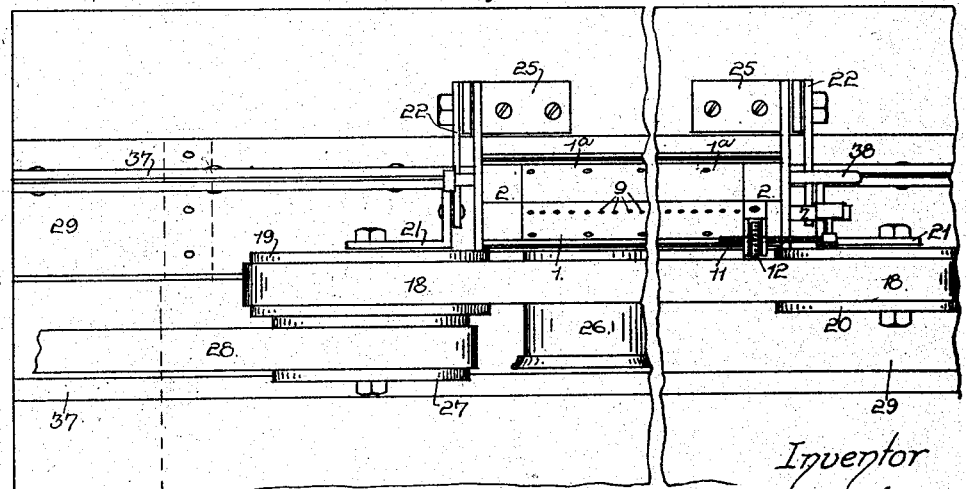
Inventor
William Head,
by
Att'ys

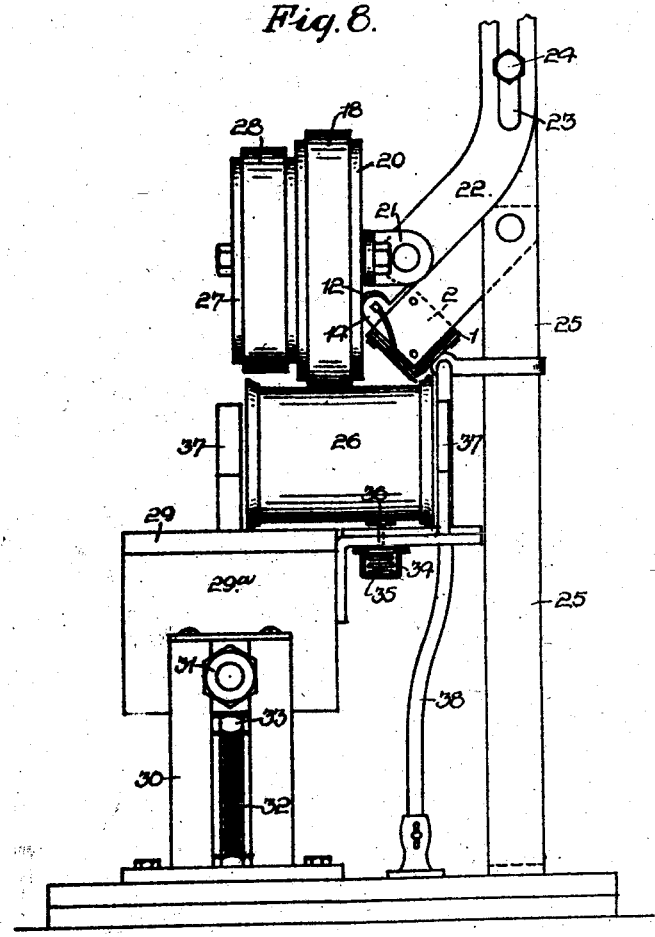

Patented Sept. 22, 1925.

1,554,671

UNITED STATES PATENT OFFICE.

WILLIAM HEAD, OF LIVERPOOL, ENGLAND.

SOLDERING OF SHEET-METAL TINS AND CANISTERS.

Application filed April 16, 1923. Serial No. 632,459.

*To all whom it may concern:*

Be it known that I, WILLIAM HEAD, a subject of the King of England, and a resident of 251 County Road, Walton, Liverpool, in the county of Lancaster, England, have invented certain new and useful Improvements in or Relating to the Soldering of Sheet-Metal Tins and Canisters, of which the following is a specification.

This invention relates to the soldering of tins, canisters, or the like, being particularly applicable to the soldering of the tops and bottoms of tins and canisters to the bodies thereof, but it is also applicable to the soldering of the side seams of the bodies.

In the customary mode of soldering the tops and bottoms of sheet metal tins and canisters, or the like, by passing same along the top of an open bath or bar, difficulty is experienced by reason of the dross or scum which rises to the surface of the molten solder in the bath or bar and tends to cause the soldering to be faulty, and to make the solder line on the tins of unnecessary width.

My invention has for its object to obviate these defects, and consists in a method of and means for soldering which are characterized in that a line or film of molten solder is presented to the moving tins, canisters, or the like, at the bottom, or underside, or lower portion of a bath or bar, and, therefore, in view of the fact that the dross or scum contained in the solder rises to the surface, said solder line or film will be clear and the soldering operation in consequence improved.

According to one mode of embodying my invention, a bath or bar comprising a V or substantially V shaped receptacle which is so constructed that when molten solder is contained therein a clear solder line or film appears at the bottom thereof, the soldering of the tins, canisters, or the like, being effected by moving same, after treatment with the usual soldering fluid or other suitable flux, into rolling contact with said solder line or film: thus the tins, canisters or the like, are prevented from contact with the dross or scum of the solder and a thin and neat film of solder may be applied; this latter feature being particularly advantageous in the soldering of printed tins.

If necessary or desirable special means may be employed whereby it is ensured that the tins, canisters, or the like, are maintained in rolling contact with the solder line or film, such as by the provision of springs below the platform on which the tins, canisters, or the like, roll longitudinally of the solder bath or bar.

Suitable arrangements may be made for adjusting, regulating or controlling the discharge of molten solder from the bath or bar.

I will further describe my invention with the aid of the accompanying sheets of explanatory drawings, which show, by way of example only, several modes of carrying same into effect.

In said drawings:—

Figs. 1 to 4, inclusive, illustrate a solder bath or bar, Fig. 1 being an elevation and Fig. 2 an end view, while Figs. 3 and 4 are plan views, partly in section, respectively showing the bath or bar in and out of condition for use;

Figs. 5 and 6 are transverse sections of modified constructions of baths or bars;

Figs. 7 to 9, inclusive, illustrate apparatus for soldering tins or canisters by the aid of the bath or bar illustrated in Figs. 1 to 4, Fig. 7 being an elevation, Fig. 8 an end view, and Fig. 9 a plan.

In the several views like characters of reference denote like or equivalent parts wherever they occur.

Referring first, more particularly, to the soldering bath or bar illustrated in Figs. 1 to 4, inclusive, 1, 1ª, represents a V shaped metal trough each end whereof is closed by means of a metal block as 2; thus a bath for the reception of molten solder is formed.

Secured by means of the screws 3 to the members 1, 1ª, of said V trough are metal strips or plates 4, 5, respectively, plate 4 being preferably of copper.

In the member 1 of the bath there is formed a longitudinal slot or channel 6 in which is slidably disposed a plate or bar 7 provided with apertures 8: apertures 9 are formed in the portion of the bath member 1 opposite said slide 7.

Secured at one end of said slide 7 is an arm 10 whereto is secured a screw threaded rod 11 which passes through a circular nut 12 disposed in a gap or slot 13 formed in a bracket 14 attached to one of the end closure members 2 of the bath. By revolving said nut 12 by means of a bar inserted in one or other of the socket holes 15 minute or vernier adjustment may be imparted to said slide 7 so as to bring the apertures 8 thereof more or less into alignment or register with the apertures 9 of member 1 of the bath and thus control or regulate the discharge of molten solder from the bath. Or the discharge may be cut off completely, when desired.

From the bath the molten solder flows on to and down the plate 4, the line or film of solder at the lower extremity of said plate being picked up by the tins, canisters, or the like, in passing.

In the modified construction of bath or bar illustrated in Fig. 5, instead of slotting the outer side of said member 1 and inserting a slide in the slot a V shaped slide 16 is disposed in the bath or bar, said slide being prevented from displacement by the guide plates 17: apertures 16$^a$ are provided in said slide 16 which apertures are adapted to move into and out of register with the apertures 9 of member 1 of the bath or bar.

In the modification illustrated in Fig. 6, the apertures 9 of the bath or bar and the apertures 16$^a$ of the slide 16 are formed in the bottoms of the bath or bar and slide, respectively.

Referring now to the soldering apparatus illustrated in Figs. 7 to 9, inclusive, 18 represents a conveyor belt or band disposed around pulleys 19, 20, said pulleys being carried by angular bracket members 21 which, in turn, are attached to arms 22 provided with slots 23: said arms 22 are secured by means of bolts 24 to uprights 25 so that the pulleys 19, 20, with belt or band 18 may be vertically adjusted as required to suit the size of the tins or canisters 26 to be soldered.

In the arrangement shown there is connected with the pulley 19 a pulley 27 which is driven by means of belt 28 from an electric motor, or the like.

Extending longitudinally of the bath or bar 1 is a platform 29, 29$^a$, which is carried at each end by a pair of uprights 30 and bolts 31. Said platform may be vertically adjusted by means of screwed rods 32 and lock nuts 33 provided at each end.

Secured to the underside of the platform 29$^a$ are guides 34 in which are disposed coiled wire springs 35 adapted to project plates 36 into contact with the then undersides of the tins or canisters 26 passing along the platform between the guides 37, and so maintain the tins or canisters in rolling contact with the bath or bar and the belt 18: said springs 35 also provide for any inequalities there may be in the sizes of the tins or canisters 26 then being soldered.

Said bath or bar may be heated by means of a gas pipe 38, or in other convenient manner.

What I claim as my invention and desire to secure by Letters Patent is:—

1. In a soldering apparatus wherein tins and the like are adapted to be soldered, an oblong structure affording a solder bath, said structure having solder outlet openings, a platform disposed below said structure, and an endless belt above said platform adapted for engagement with tins for rolling said tins longitudinally of said platform with said tins positioned to receive solder from the outlet openings of said structure.

2. A soldering apparatus as called for in claim 1, and means slidable longitudinally of said structure for controlling the outlet of solder.

3. In a soldering apparatus wherein cylindrical receptacles are adapted to be soldered, an oblong structure affording a solder bath, said structure having solder outlet openings, plates carried by said structure and co-operating in providing a longitudinal solder guide, means longitudinally of said structure for regulating the flow of solder from said structure, and means for causing cylindrical receptacles to roll lengthwise of said structure to receive solder therefrom.

4. A solder bath for soldering purposes, comprising an oblong structure having solder outlet openings, an apertured valvular member shiftable longitudinally in said structure for controlling the outlet of solder at said openings, and plates carried by said structure and affording an oblong opening through which solder passes from said structure.

In testimony whereof I affix my signature.

WILLIAM HEAD.